United States Patent
Kaneko (12)

(10) Patent No.: US 6,633,450 B1
(45) Date of Patent: Oct. 14, 2003

(54) METHOD OF AND APPARATUS FOR CONTROLLING DISK DRIVE

(75) Inventor: Hisashi Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/371,559

(22) Filed: Aug. 10, 1999

(30) Foreign Application Priority Data

Feb. 5, 1999 (JP) .......................................... 11-029153

(51) Int. Cl.[7] .......................... G11B 15/46; G11B 15/18
(52) U.S. Cl. ...................................... 360/73.03; 360/69
(58) Field of Search .......................... 360/69, 71, 73.01, 360/73.03

(56) References Cited

U.S. PATENT DOCUMENTS

| | | | | |
|---|---|---|---|---|
| 5,050,145 A | * | 9/1991 | Yoshida ................. | 360/73.03 |
| 5,854,719 A | * | 12/1998 | Ginosar et al. ............ | 360/69 |
| 6,078,158 A | * | 6/2000 | Heeren et al. ............ | 318/430 |
| 6,169,381 B1 | * | 1/2001 | Arai et al. ............... | 318/560 |
| 6,201,657 B1 | * | 3/2001 | Shimizu et al. .......... | 360/73.03 |
| 6,215,609 B1 | * | 4/2001 | Yamashita et al. ....... | 360/73.03 |

FOREIGN PATENT DOCUMENTS

| | | |
|---|---|---|
| JP | 4143961 | 5/1992 |
| JP | 8077698 | 3/1996 |

* cited by examiner

Primary Examiner—Andrew L. Sniezek
(74) Attorney, Agent, or Firm—Greer, Burns & Crain, Ltd.

(57) ABSTRACT

A method and an apparatus for controlling a disk drive are contrived to reduce consumed electric power of a spindle motor of the disk drive while an operation continues. The disk drive has a disk storage medium, the spindle motor for rotating the disk storage medium, and a head for reading data on the disk storage medium. This control method comprises a first step of detecting a load of the spindle motor or a load capacity of a power source of the disk drive, and a second step of selecting any one of a first mode of revolving the spindle motor at a comparatively high speed and reading the data on the disk storage medium by the head, and a second mode of revolving the spindle motor at a comparatively low speed and reading the data on the disk storage medium by the head in accordance with a detected result of the first step.

22 Claims, 9 Drawing Sheets

METHOD OF AND APPARATUS FOR CONTROLLING DISK DRIVE

BACKGROUND OF THE INVENTION

1. Field of the Invention

The present invention relates to a method of and an apparatus for controlling a disk drive, which are contrived to reduce consumed electric power of the disk drive, and more particularly to a disk drive control method and apparatus suitable for a disk drive driven by a battery.

2. Related Background Art

A disk drive such as a magnetic disk drive, e.g., has widely been utilized as a storage device for a computer. The disk drive is, with its downsizing attained in recent years, mounted in a computer driven by a battery such as a note-type personal computer, e.g. A reduction in consumed electric power of the disk drive is required for this type of battery-driven apparatus.

The magnetic disk device, when performing a recording/reproducing operation, operates at a single spindle revolving speed. Then, a motor constant of the spindle motor is determined so that the spindle motor operates with a stability under all sorts of operating environments assured by the magnetic disk device.

This type of magnetic disk device has increasingly been mounted in the battery-driven apparatus such as the note-type personal computer, e.g. A power source capacity of the battery is limited, and hence a decrease in consumed electric power is requested of the magnetic disk device.

Such being the case, there is proposed a method of stopping the spindle motor if there is no access to the magnetic disk device for a fixed period of time from the host computer (Japanese Patent Application Laid-Open Publication No. 4-143961).

There arise the following problems inherent in the prior art.

(1) As the operation system for the personal computer in recent years frequently accesses the magnetic disk device in a normal using state, it is difficult to attain a state where the spindle motor stops. Therefore, a battery drive time is substantially hard to extend.

(2) Further, when accessing the magnetic disk device in the state where the spindle motor halts, the user must wait several seconds for performing the recording and reproducing until the revolutions of the spindle motor are stabilized. Therefore, smoothness of the operation is lost.

(3) Some of the magnetic disk devices have been developed in recent years in a way that a fluid dynamic pressure bearing is used as a bearing of the spindle motor. It is characteristic of the fluid dynamic pressure bearing that an accuracy of revolutions is enhanced and that noises are small. The fluid bearing has, however, such a tendency that as a temperature decreases, a fluid viscosity of the bearing rises, and a torque loss of the bearing unit increases. This torque loss leads directly to an increase in the consumed electric power of the magnetic disk device. Therefore, the consumed electric power largely increases at a low temperature as compared with a case at a normal temperature. Especially the note-type personal computer might be used under an environment where the temperature is as low as 5° C. or under, which conduces to the problem that the consumed electric power rises.

(4) Moreover, in the case of executing the recording/reproducing operation only when the spindle motor operates at the single revolving speed, the spindle motor is so designed as to keep the revolving speed with a stability under a high-load condition. It is therefore required that a limit number of revolutions of the spindle motor, which is a maximum revolving speed when the spindle motor is revolved under a predetermined load and a predetermined drive voltage without controlling the speed, is high. Therefore, the spindle motor having a large quantity of consumed electric power is needed.

SUMMARY OF THE INVENTION

It is a primary object of the present invention, which was devised to obviate the above problems inherent in the prior art, to provide a method of and an apparatus for controlling a disk drive, which are contrived to reduce consumed electric power of a spindle motor of the disk drive.

It is another object of the present invention to provide a method of and an apparatus for controlling a disk drive, which are contrived to reduce consumed electric power while the operation continues.

It is a further object of the present invention to provide a method of and an apparatus for controlling a disk drive, which are contrived to prevent the consumed electric power from rising even when a load of the spindle motor increases.

It is a still further object of the present invention to provide a method of and an apparatus for controlling a disk drive, which are contrived to reduce the consumed electric power in accordance with a capacity of a power source such as a battery, e.g.

To accomplish the above objects, according to a first aspect of the present invention, there is provided a method of controlling a disk drive having a disk storage medium, a spindle motor for rotating the disk storage medium, and a head for reading data on the disk storage medium. The control method comprises a first step for detecting a load of the spindle motor or a load capacity of a power source of the disk drive, and a second step for selecting any one of a first mode of revolving the spindle motor at a comparatively high speed in accordance with a detected result and reading the data on the disk storage medium by the head, and a second mode of revolving the spindle motor at a comparatively low speed in accordance with a detected result and reading the data on the disk storage medium by the head.

Therefore, if a load of the spindle motor is high, the recording/reproducing process is executed with the low-speed revolutions, and hence the consumed electric power can be restrained from rising. Further, if the power source has a small capacity, the recording/reproducing process can be implemented with the low-speed revolutions, and the consumed electric power is decreased. Consequently, especially a battery drive time of a battery-driven apparatus can be extended.

Moreover, it is feasible to use a spindle motor exhibiting a high torque constant and a small limit number of revolutions, so that consumed electric power can be further reduced.

In the control method according to the second aspect of the invention, the second step comprises a step for selecting the second mode if the load is higher than a predetermined value or if the load capacity is smaller than a predetermined value.

In the control method according to the third aspect of the invention, the second step further comprises a step for retaining the second mode for a predetermined time after selecting the second mode. It is possible to prevent the first and second modes from being frequently switched over with a change in the load or the load capacity.

In the control method according to the fourth aspect of the invention, the second step comprises a step for, after selecting the second mode, returning to the first mode corresponding to the fact that the load of the spindle motor is lower than a second predetermined value, or that the load capacity is larger than a third predetermined value.

It is therefore feasible to prevent the first and second modes from being frequently switched over with the change in the load or the load capacity.

In the control method according to the fifth aspect of the invention, the first step comprises a step for detecting a temperature of the spindle motor. The operation can be switched over to a mode in which the consumed electric power is decreased by detecting a change in the load due to a variation in viscosity of a fluid dynamic pressure bearing of the spindle motor based on the temperature of the spindle motor.

In the control method according to the sixth aspect of the invention, the first step comprises a step for detecting a change in the number of revolutions of the spindle motor. The operation can be switched over to a mode in which the consumed electric power is decreased by detecting the change in the load due to the variation in viscosity of the fluid dynamic pressure bearing of the spindle motor based on the change in the number of revolutions of the spindle motor.

In the control method according to the seventh aspect of the invention, the first step comprises a step for detecting a voltage of the power source. The operation can be switched over to a low consumed power mode by detecting a residual capacity of the power source based on the voltage of the power source. Therefore the battery drive time can be extended.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DESCRIPTION OF THE PREFERRED EMBODIMENTS

Figure 1:
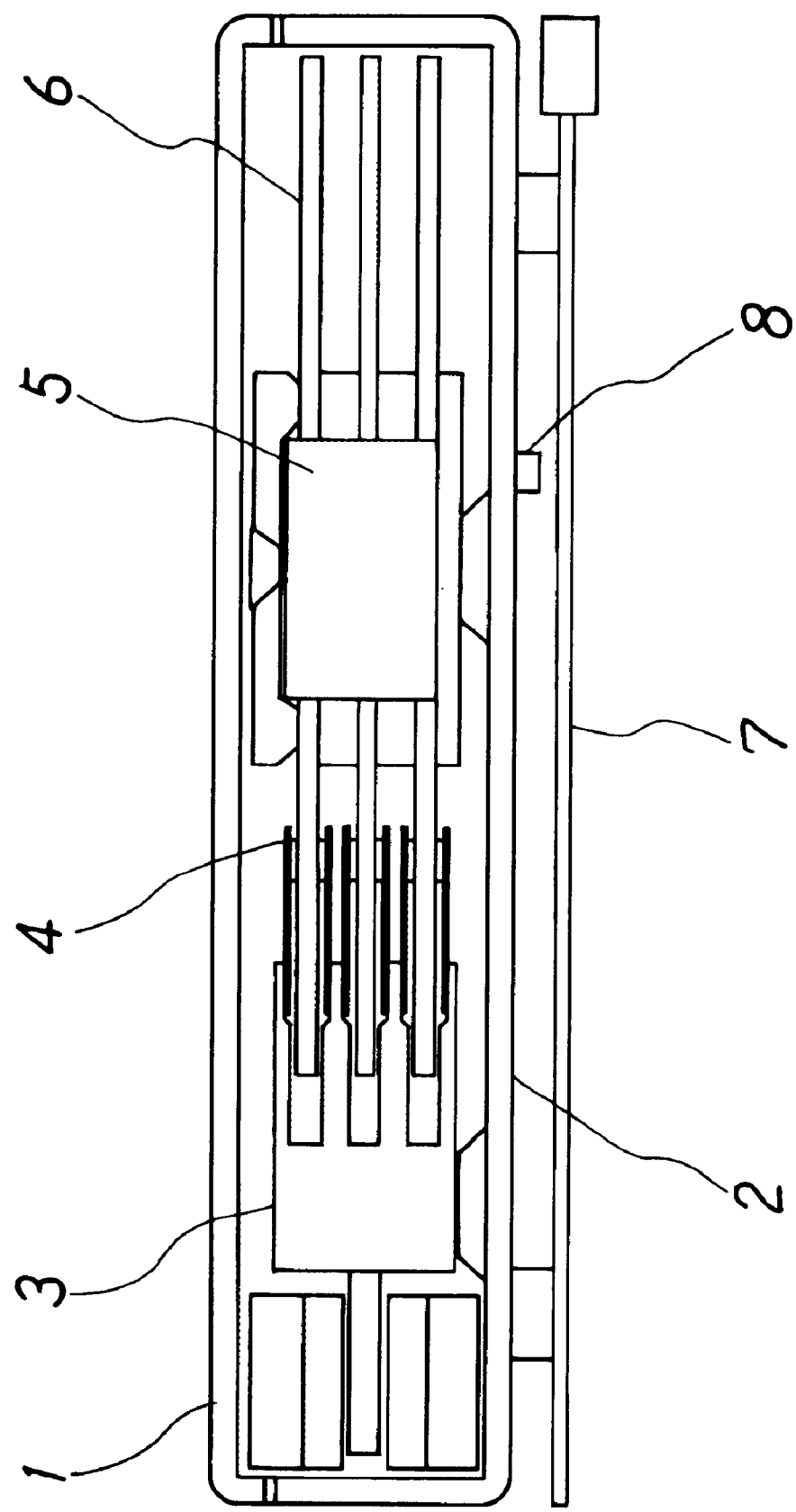
FIG. 1 is a view showing a construction in a first embodiment of the present invention.
Figure 2:
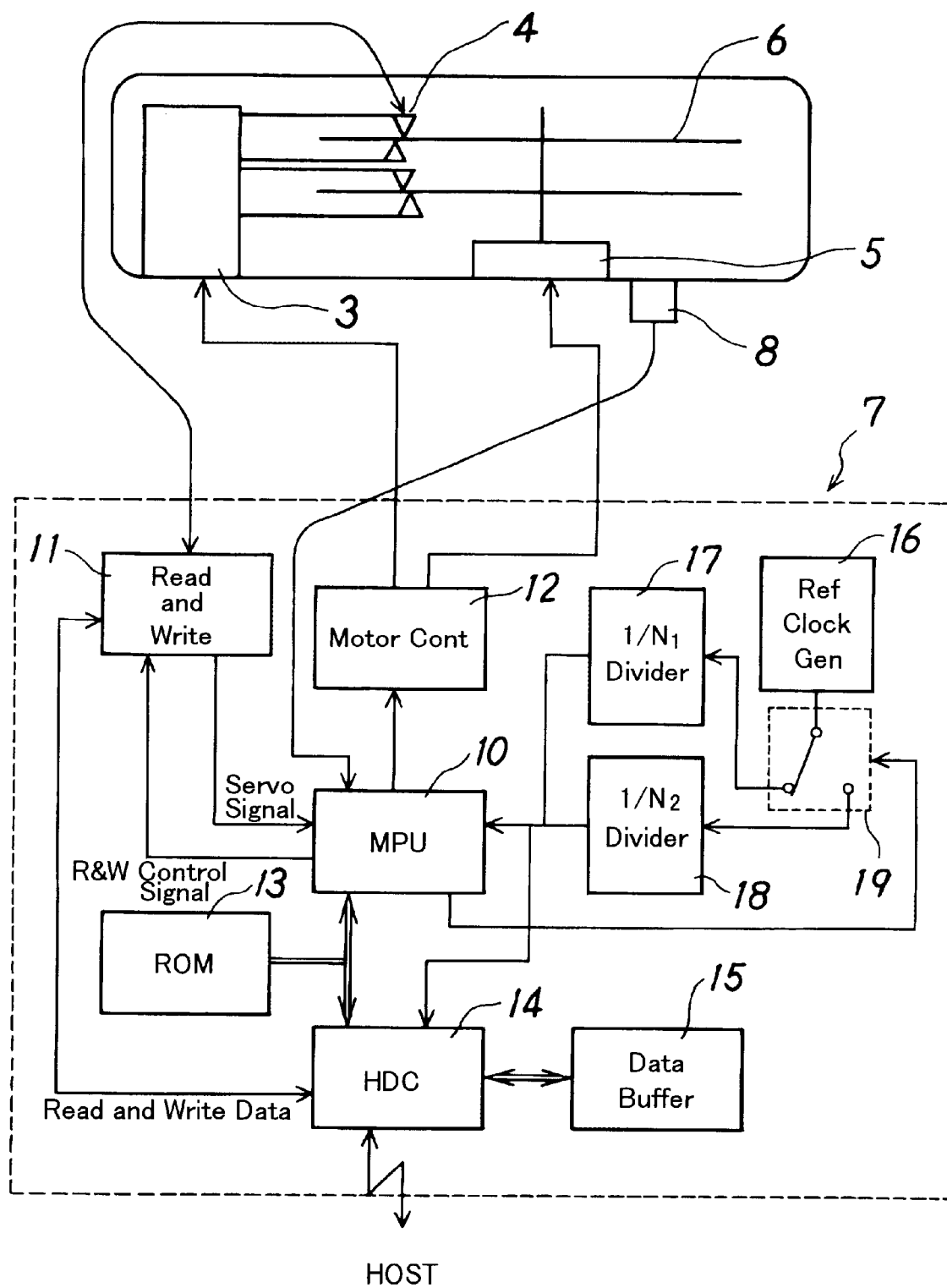
FIG. 2 is a block diagram showing the construction in FIG. 1.

FIG. 1 is a view showing a construction of a magnetic disk device in the first embodiment of the present invention. FIG. 2 is a block diagram of the magnetic disk device.

As shown in FIG. 1, a magnetic disk 6 is rotated by a spindle motor 5. The spindle motor 5 has a fluid bearing as a bearing mechanism. A fluid viscosity of this fluid bearing changes corresponding to a temperature, and hence a load of the spindle motor changes. A magnetic head 4 is provided at an actuator 3. The magnetic head 4 reads and writes data from and to the magnetic disk 6. The actuator 3 is constructed of a voice coil motor. The actuator 3 locates the magnetic head 4 at a desired track on the magnetic disk 6.

The actuator 3 and the spindle motor 5 are provided on a drive base 2. A cover 1 covers the drive base 2, whereby an interior of the drive is isolated from outside. A printed board 7 is provided outwardly of the drive, and is mounted with a control circuit of the drive. A temperature sensor 8 is provided on the drive base 2 and detects a temperature of the drive. The temperature sensor 8 is capable of detecting a temperature of the spindle motor 5.

As illustrated in FIG. 2, the printed board 7 includes a microprocessor 10(which is hereinafter abbreviated to an MPU) for control. A recording/reproducing circuit 11 is a circuit through which the magnetic head 4 writes and reads data to and from the magnetic disk 6. The recording/reproducing circuit 11 executes recording/reproducing processes at a frequency based on a recording/reproducing clock given from the MPU 10. The recording/reproducing circuit 11 transmits a servo signal to the MPU 10 and the read data to the HDC 14, and receives the write data from the HDC 14.

A motor controller 12, upon an indication from the MPU 10, drives the actuator 3 and the spindle motor 5. The motor controller 12, when low-speed revolutions are indicated, drives the spindle motor 5 at a low speed (e.g., 3600 rpm). The motor controller 12, when high-speed revolutions are indicated, drives the spindle motor 5 at a high speed (e.g., 4200 rpm).

A read-only-memory (ROM) 13 is stored with programs executed by the MPU 10 and the HDC 14. The hard disk controller (HDC) 14 transmits and receives the data to and from a host device such as a personal computer etc. The HDC 14 transmits and receives the data to and from the recording/reproducing circuit 11 in accordance with a recording/reproducing clock. A data buffer 15 temporarily stores the data given to or from the host device.

A reference clock oscillator 16 generates a reference clock. A first frequency dividing circuit 17 divides a frequency of the reference clock by N1, thereby generating a low-speed recording/reproducing clock. A second frequency dividing circuit 18 divides the frequency of the reference clock by N2, thereby generating a high-speed recording/reproducing clock. The high-speed recording/reproducing clock has a frequency higher than that of the low-speed recording/reproducing clock.

A switch 19, corresponding to a high-speed indication given from the MPU 10, outputs the reference clock of the reference clock oscillator 16 to the second frequency dividing circuit 18. Further, the switch 19, corresponding to a low-speed indication given from the MPU 10, outputs the reference clock of the reference clock oscillator 16 to the first frequency dividing circuit 17. The MPU 10 outputs the recording/reproducing clock to the recording/reproducing circuit 11.

Figure 3:
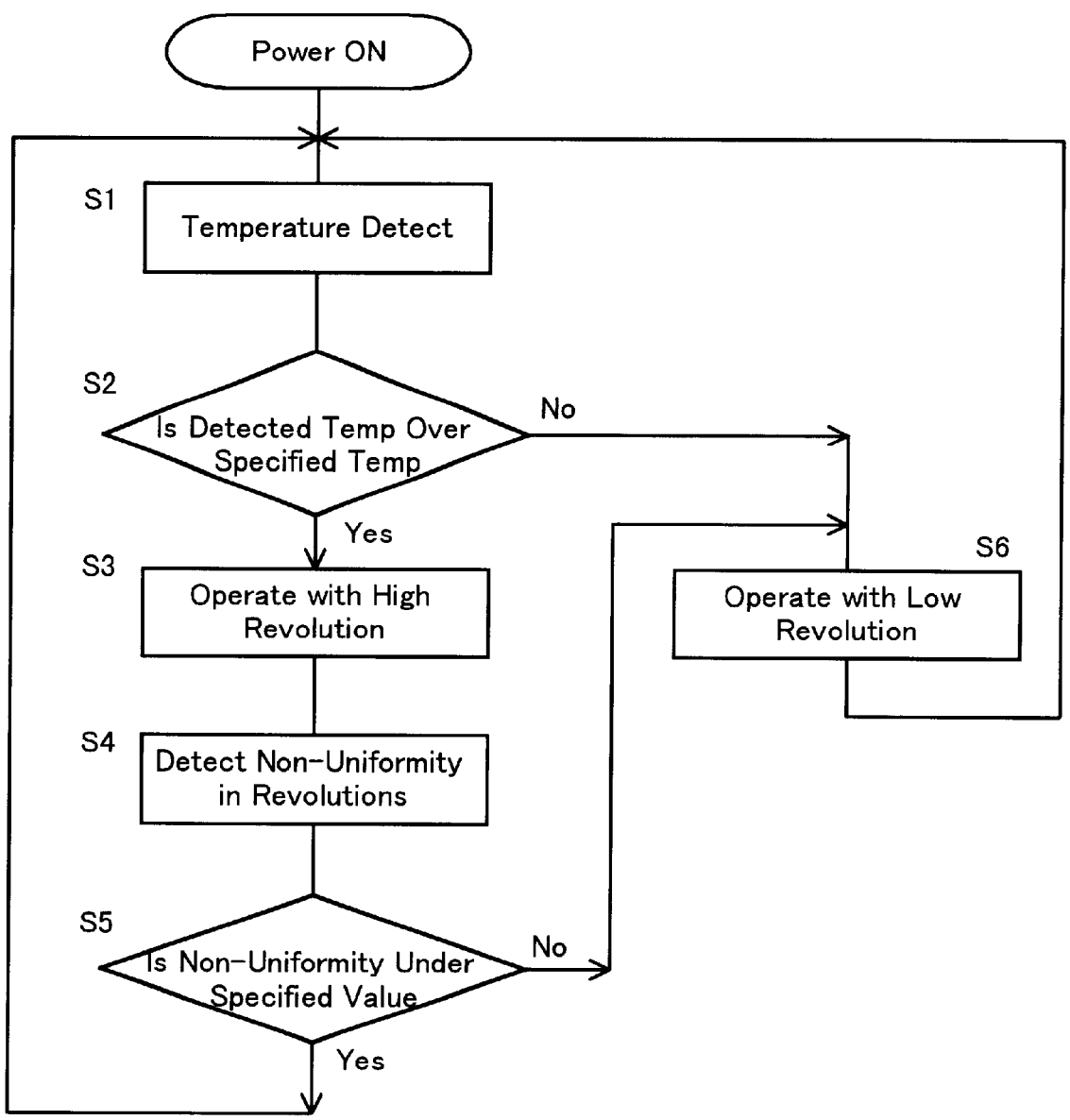
FIG. 3 is a processing flowchart in the first embodiment of the present invention.
Figure 4:
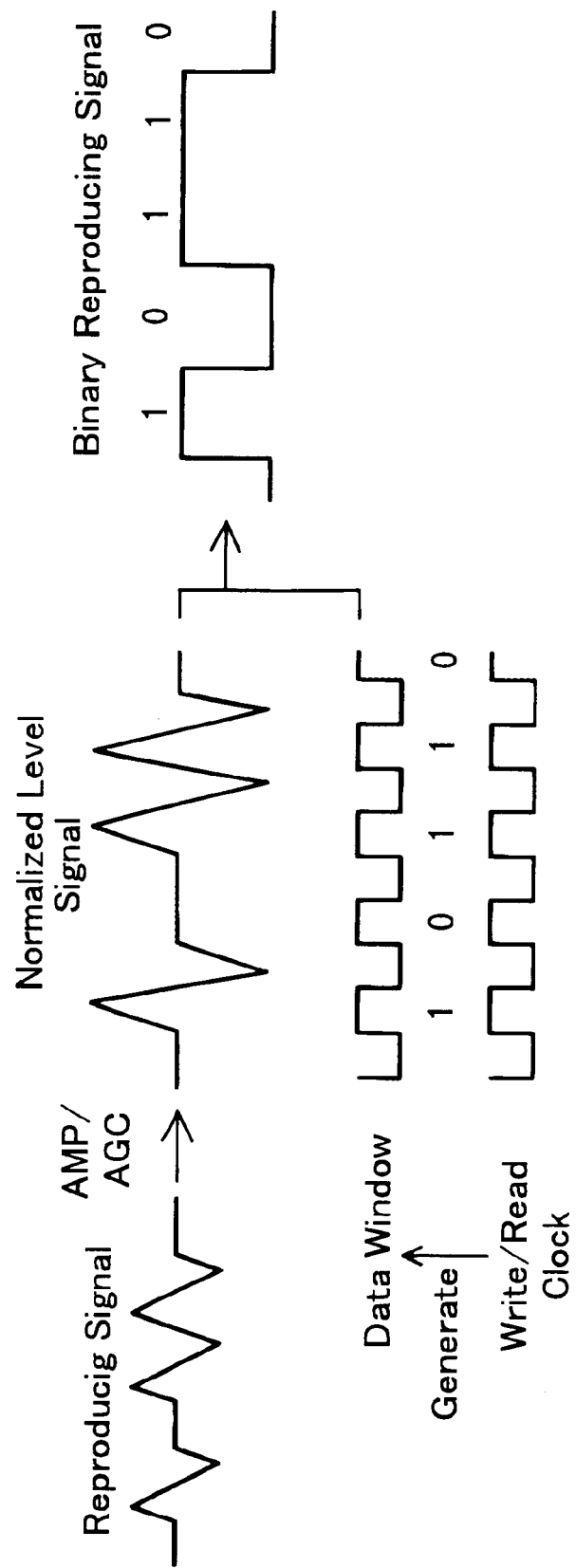
FIG. 4 is an explanatory diagram showing an operation when revolved at a low speed.
Figure 5:
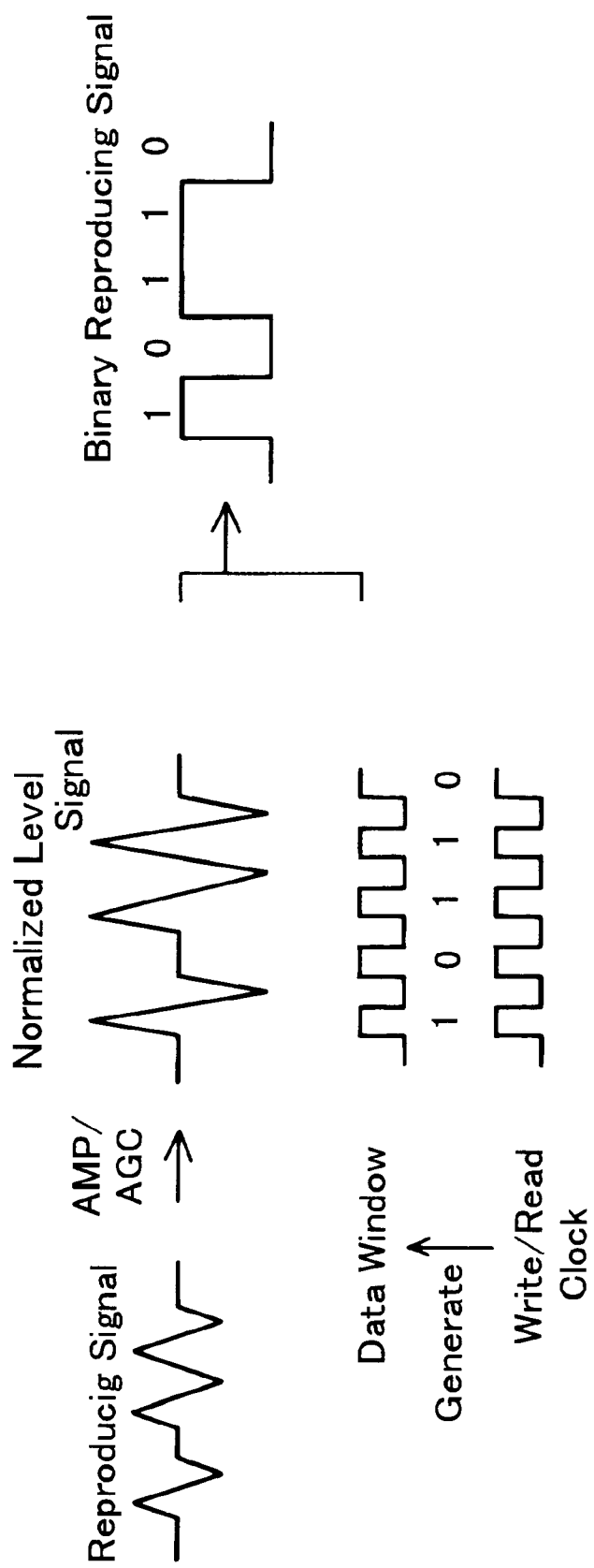
FIG. 5 is an explanatory diagram showing an operation when revolved at a high speed.
Figure 6:
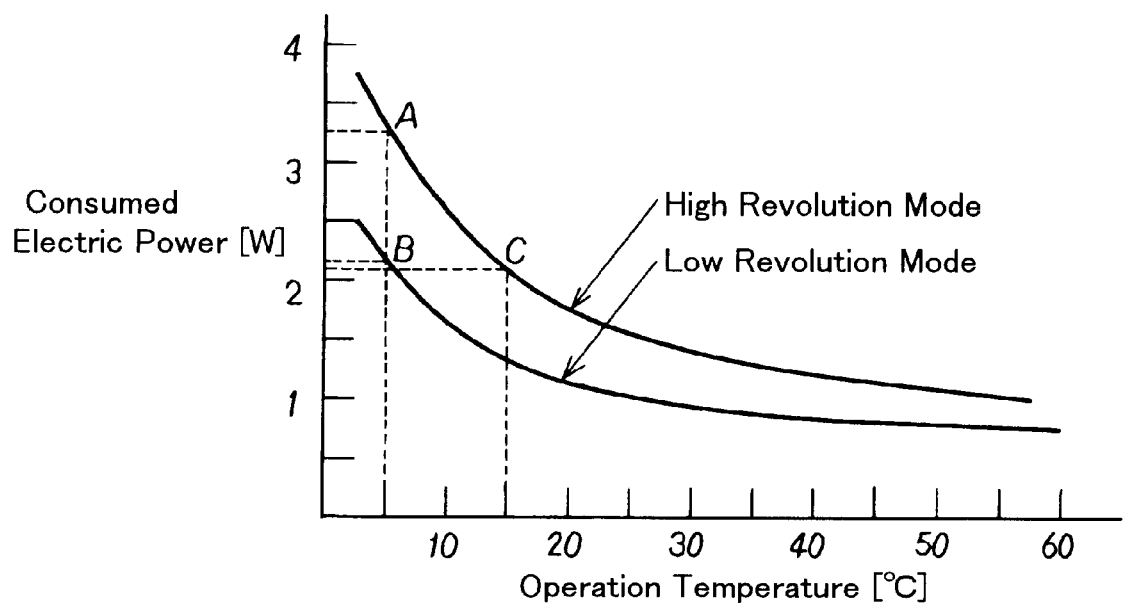
FIG. 6 is a characteristic diagram of consumed electric power corresponding to a change in temperature, which is explanatory of the first embodiment of the present invention.

FIG. 3 is a processing flowchart in a first embodiment of the present invention. FIG. 4 is an explanatory diagram showing an operation when revolved at a low-speed. FIG. 5 is an explanatory diagram showing an operation when revolved at a high-speed. FIG. 6 is a characteristic diagram of consumed electric power corresponding to a change in temperature.

(S1) The MPU 10, when detecting that a power source is switched ON, detects a temperature of the temperature sensor 8.

(S2) The MPU 10 judges whether or not the detected temperature is a specified temperature (e.g., 15° C.) or higher. This specified temperature is set to a temperature at which bearing loss of the motor 5 increases. If the detected temperature does not exceed the specified temperature, the MPU 10 diverts to step S6.

(S3) The MPU 10, if the detected temperature is over the specified temperature, indicates a high-speed revolution to the motor controller 12. The motor controller 12, corresponding to the high-speed indication, makes the spindle motor 5 revolve at a speed as high as, e.g., 4200 rpm. Simultaneously, the MUP 10 switches over the switch 19 to the second frequency dividing circuit 18. With this switchover, the high-speed recording/reproducing clock having the high frequency is supplied via the MPU 10 to the recording/reproducing circuit 11. Further, the MPU 10 indicates the high speed revolution to the recording/reproducing circuit 11. The recording/reproducing circuit 11, when in a reading process, as shown in FIG. 5, generates a data window signal from the recording/reproducing clock signals. Then, a reading output of the magnetic head 4 is binarized by the data window signal, thereby obtaining a regenerative signal. Similarly when in a writing process, the write data is supplied to the magnetic head 4 in accordance with the recording/reproducing clock signal.

(S4) The MPU 10 detects a non-uniformity in revolutions of the spindle motor 5. Therefore, the MPU 10 receives from the recording/reproducing circuit 11 an index signal of the magnetic disk 6 which is regenerated by the magnetic head 4. The index signal represents a one-rotation interval of the magnetic disk 6.

(S5) The MPU 10 measures an interval between the index signals, and calculates a difference from a fiducial interval for the high speed. If the difference falls within a specified value, the MPU 10 judges that there is no non-uniformity in revolutions. Then, the MPU 10 returns to step S1. Whereas if the difference exceeds the specified value, the MPU 10 judges that there is the non-uniformity in revolutions, and advances to step S6.

(S6) The MPU 10, when the detected temperature is not over the specified temperature, or when judging that there is caused the non-uniformity in revolutions, indicates the low-speed revolution mode to the motor controller 12. The motor controller 12, corresponding to the low-speed indication, makes the spindle motor 5 revolve at a speed as low as, e.g., 3600 rpm. Simultaneously, the MPU 10 switches over the switch 19 to the first frequency dividing circuit 17. With this switchover, the low-speed recording/reproducing clock having the low frequency is supplied via the MPU 10 to the recording/reproducing circuit 11.

Moreover, the MPU 10 indicates the low speed revolution to the recording/reproducing circuit 11. The recording/reproducing circuit 11, when in the reading process, as shown in FIG. 4, generates a data window signal from the recording/reproducing clock signal having a low frequency. Then, a reading output of the magnetic head 4 is binarized by the data window signal, thereby obtaining a regenerative signal. Similarly when in the writing process, the write data is supplied to the magnetic head 4 in accordance with the recording/reproducing clock signal. Then, the MPU 10 goes back to step S1.

Thus, if the ambient temperature is low, a torque loss of the fluid bearing rises, and it is judged that the load of the spindle motor 5 is large. Then, if the load is great, the consumed electric power increases in the case of revolving the spindle motor at the high speed. Therefore, the spindle motor is switched over to the low-speed revolution mode requiring less consumed electric power. Hence, a life-span of a battery power source of the personal computer can be greatly extended while the operation continues.

For instance, as shown in FIG. 6, there is a large difference in consumed electric power between the high-speed revolution mode and the low-speed revolution mode in accordance with an operating temperature. Namely, the consumed electric power becomes larger at a lower temperature. Herein, when the temperature is 5° C., the consumed electric power in the high-speed revolution mode is approximately twice as large as the consumed electric power in the low-speed revolution mode. It is feasible to remarkably reduce the consumed electric power by, as in this embodiment, switching over the spindle motor from the high-speed revolution mode to the low-speed revolution mode when the operating temperature is low.

Further, if the temperature rises through a self-exothermic process etc, and the load is relieved, the operation reverts to the low-speed revolution mode, whereby the-high recording/ reproducing speed can be returned. Further, the recording/ reproducing clock of the recording/reproducing circuit changes corresponding to the high-speed and low-speed revolution modes, and hence, even when changing the revolving speed, it is possible to prevent a change of a recording density.

Similarly, if the bearing loss increases, the spindle motor is incapable of revolving with a stability in the high-speed revolution mode. This might be detected from the non-uniformity of the revolutions, and the operation continues in the low-speed revolution mode. Therefore, in addition to relieving the consumed electric power, there is an advantage in which the recording/reproducing operation can continue even in such a state that the load of the spindle motor is high.

Figure 7:
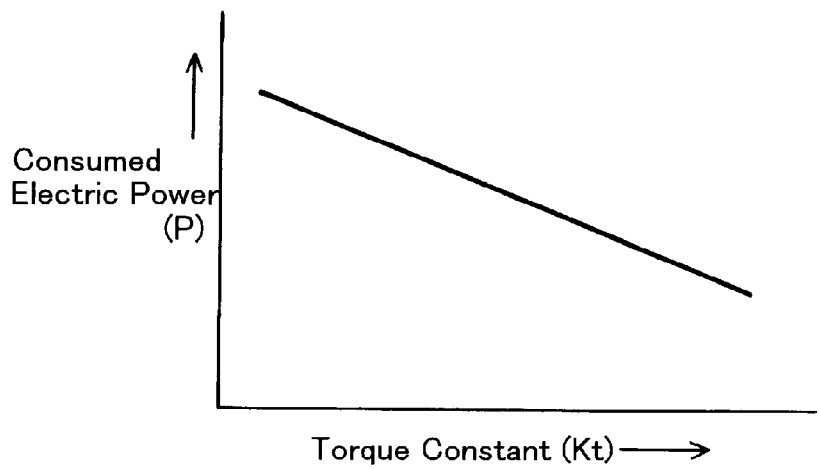
FIG. 7 is a diagram showing a relationship between a torque constant and the consumed electric in the first embodiment of the present invention.
Figure 8:
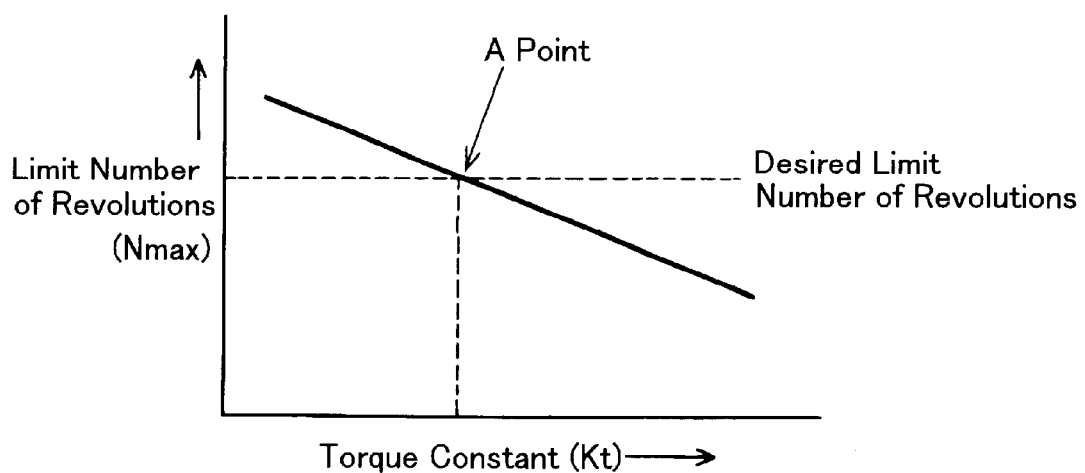
FIG. 8 is a diagram showing a relationship between a torque constant and the limit number of revolutions, which is explanatory of the first embodiment of the present invention.

FIG. 7 is a diagram showing a relationship between a torque constant and the consumed electric power, which is explanatory of the first embodiment of the present invention. FIG. 8 is a diagram showing a relationship between the torque constant and a limit number of revolutions, which is explanatory of the first embodiment of the present invention.

When taking a method of selecting the high-speed and low-speed revolution modes corresponding to the load described above, the spindle motor with small consumed electric power can be used. A torque constant indicating how much output torque is obtained with respect to a magnitude of the electric current, may be given as a vital design constant of the motor. FIG. 7 shows a relationship between the torque constant and the consumed electric power in the case of generating a fixed output. As shown in FIG. 7, the torque constant (K) becomes larger with lower consumed electric power. Accordingly, it is desired in terms of reducing the consumed electric power that the torque constant be designed as high as possible. A method of raising the torque constant may be exemplified such as enhancing a magnetic force of the magnetic circuit and increasing the number of windings of the electromagnetic coil.

On the other hand, FIG. 8 shows the relationship between the torque constant and the limit number of revolutions under a fixed load condition. As shown in FIG. 8, when raising the torque constant, the limit number of revolutions decreases. Accordingly, when the limit number of revolutions is determined, the torque constant is correspondingly determined.

An enhancement of efficiency by increasing the torque constant is attained by decreasing the desired limit number of revolutions. In the conventional disk drive, however, there has been a necessity of being revolved at a rated number of revolutions, including a case where the load of the motor rises in a low-temperature state, e.g. It was therefore required that the desired limit number of revolutions be set somewhat higher with an allowance given thereto irrespective of the load. Accordingly, this might have been a hindrance against the reduction in the consumed electric power.

The present invention being applied, if the load of the motor in the low-temperature state rises, the motor is switched over to a lower number of revolutions than the rated number of revolutions. Therefore, a desired limit number of revolutions may be set so that the motor revolves at the number of high-speed revolutions only in the state where the load is light at a normal temperature at which the motor is used most frequently. It is therefore feasible to adopt, because of the limit number of revolutions being able to be set low, the spindle motor exhibiting the high torque constant and the small consumed electric power. The consumed electric power can be thereby made still smaller.

Figure 9:
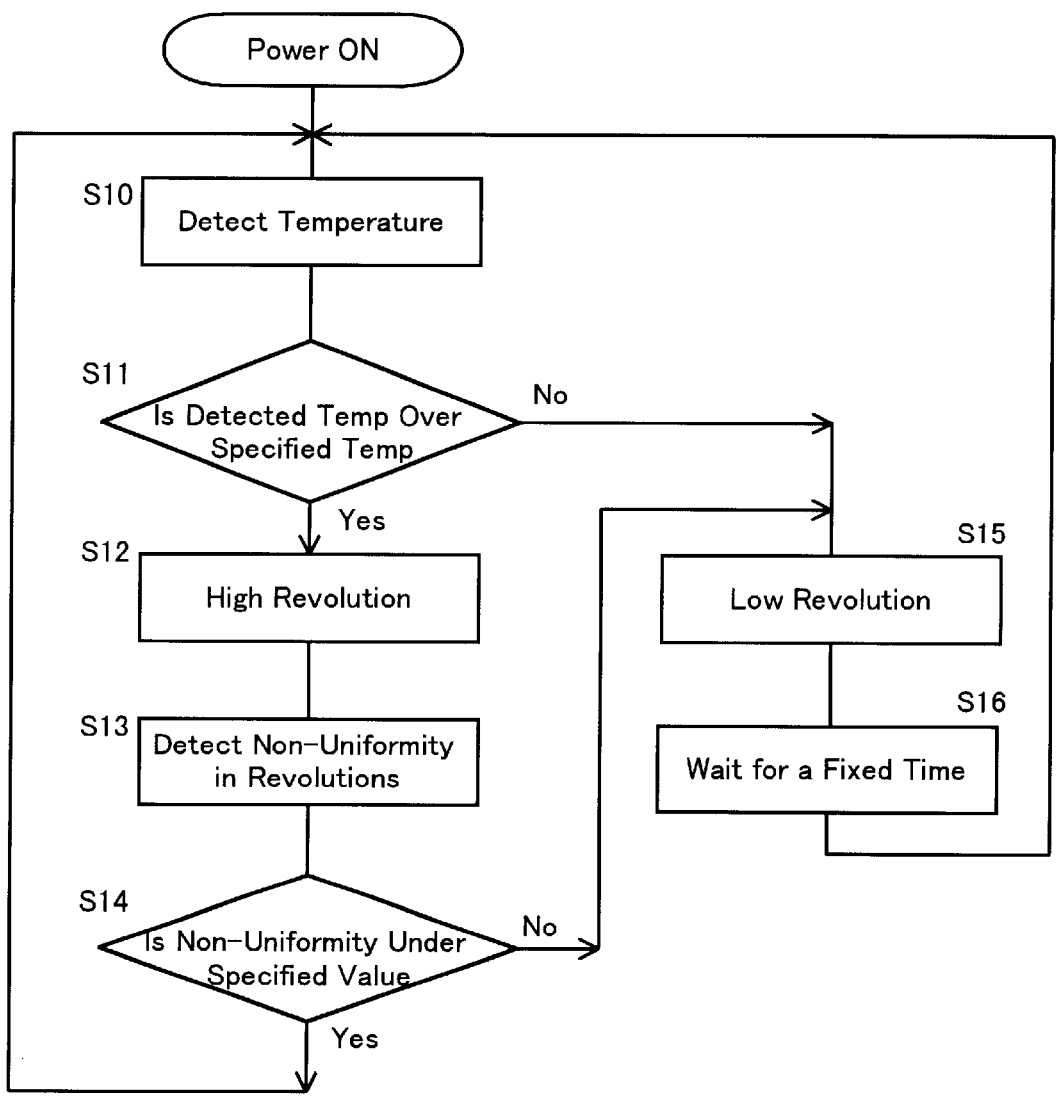
FIG. 9 is a processing flowchart in a second embodiment of the present invention.

Next, a second embodiment of the present invention will be discussed. FIG. 9 is a processing flowchart in the second embodiment of the present invention.

(S10) The MPU 10, when detecting that the power source is switched ON, detects a temperature of the temperature sensor 8.

(S11) The MPU 10 judges whether or not the detected temperature is a specified temperature (e.g., 15° C.) or higher. If the detected temperature does not exceed the specified temperature, the MPU 10 diverts to step S15.

(S12) The MPU 10, if the detected temperature is over the specified temperature, indicates the high-speed revolution mode to the motor controller 12. The motor controller 12, corresponding to the high-speed indication, makes the spindle motor 5 revolve at a high speed. Simultaneously, the MUP 10 switches over the switch 19 to the second frequency dividing circuit 18. With this switchover, the high-speed recording/reproducing clock having the high frequency is supplied via the MPU 10 to the recording/reproducing circuit 11. Further, the MPU 10 indicates the high speed revolution to the recording/reproducing circuit 11. The recording/reproducing circuit 11, when in the reading process, as shown in FIG. 5, generates the data window signal from the recording/reproducing clock signals. Then, a reading output of the magnetic head 4 is binarized by the data window signal, thereby obtaining a regenerative signal. Similarly when in the writing process, the write data is supplied to the magnetic head 4 in accordance with the recording/reproducing clock signal.

(S13) The MPU 10 detects a non-uniformity in revolutions of the spindle motor 5. Therefore, the MPU 10 receives from the recording/reproducing circuit 11 an index signal of the magnetic disk 6 which is regenerated by the magnetic head 4. The index signal represents a one-rotation interval of the magnetic disk 6.

(S14) The MPU 10 measures an interval between the index signals, and calculates a difference from a fiducial interval for the high speed. If the difference falls within a specified value, the MPU 10 judges that there is no non-uniformity in revolutions. Then, the MPU 10 returns to step S10. Whereas if the difference exceeds the specified value, the MPU 10 judges that there is the non-uniformity in revolutions, and advances to step S15.

(S15) The MPU 10, when the detected temperature is not over the specified temperature, or when judging that there is caused the non-uniformity in revolutions, indicates the low-speed revolution mode to the motor controller 12. The motor controller 12, corresponding to the low-speed indication, makes the spindle motor 5 revolve at a low speed as low as, e.g., 3600 rpm. Simultaneously, the MPU 10 switches over the switch 19 to the first frequency dividing circuit 17. With this switchover, the low-speed recording/reproducing clock having the low frequency is supplied via the MPU 10 to the recording/reproducing circuit 11. Furthermore, the MPU 10 indicates the low speed revolution to the recording/reproducing circuit 11. The recording/reproducing circuit 11, when in the reading process, as shown in FIG. 4, generates the data window signal from the recording/reproducing clock signal having the low frequency. Then, the reading output of the magnetic head 4 is binarized by the data window signal, thereby obtaining the regenerative signal. Similarly when in the writing process, the write data is supplied to the magnetic head 4 in accordance with the recording/reproducing clock signal.

(S16) The MPU 10 waits for a fixed period of time after switching over to the low-speed revolution mode, and then goes back to step S10.

The additional operation in the second embodiment to the first embodiment shown in FIG. 3 is that the MPU 10 waits for the fixed period of time after switching over to the low-speed revolution mode. This is because the switchover is frequently performed in the vicinity of the specified temperature unless waiting for the fixed period of time, and because a fixed time mode is held to avoid those frequent switchovers.

Further, the following is a method of avoiding the frequent switchovers. A temperature detected just when switched over to the low-speed revolution mode is stored. Then, after detecting that the detected temperature rises by over 5° C. from the temperature stored, the operation returns to the high-speed revolution mode. The frequent switchovers can thus be also prevented.

Figure 10:
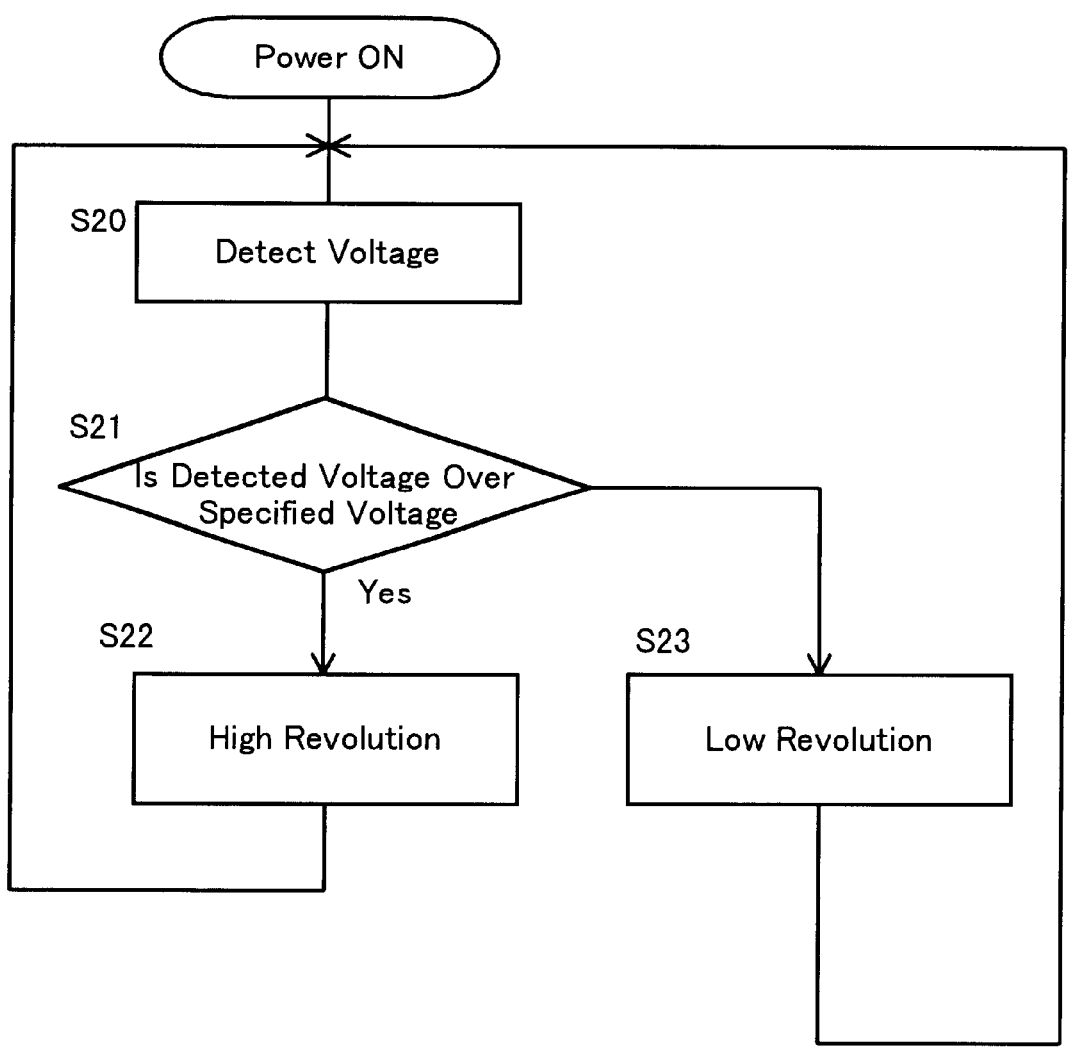
FIG. 10 is a processing flowchart in a third embodiment of the present invention.

FIG. 10 is a processing flowchart in a third embodiment of the present invention.

(S20) The MPU 10, when detecting that the power source is switched ON, detects a power source voltage inputted from the personal computer.

(S21) The MPU 10 judges whether or not the detected voltage exceeds a specified voltage. If the detected voltage does not exceed the specified voltage, the MPU 10 diverts to step S23.

(S22) The MPU 10, if the detected voltage is over the specified voltage, indicates the high-speed revolution mode to the motor controller 12. The motor controller 12, corresponding to the high-speed indication, makes the spindle motor 5 revolve at a high speed. Simultaneously, the MPU 10 switches over the switch 19 to the second frequency dividing circuit 18. With this switchover, the high-speed recording/reproducing clock having the high frequency is supplied via the MPU 10 to the recording/reproducing circuit 11. Further, the MPU 10 indicates the high speed revolution to the recording/reproducing circuit 11. The recording/reproducing circuit 11, when in the reading process, as shown in FIG. 5, generates the data window signal from the recording/reproducing clock signals. Then, the reading output of the magnetic head 4 is binarized by the data window signal, thereby obtaining a regenerative signal. Similarly when in the writing process, the write data is supplied to the magnetic head 4 in accordance with the recording/reproducing clock signal. Then, the operation returns to step S20.

(S23) The MPU 10, when the detected voltage does not exceed the specified voltage, indicates the low-speed revolution mode to the motor controller 12. The motor controller 12, corresponding to the low-speed indication, makes the spindle motor 5 revolve at a low speed as low as, e.g., 3600 rpm. Simultaneously, the MPU 10 switches over the switch 19 to the first frequency dividing circuit 17. With this switchover, the low-speed recording/reproducing clock having the low frequency is supplied via the MPU 10 to the recording/reproducing circuit 11. Furthermore, the MPU 10 indicates the low speed revolution to the recording/reproducing circuit 11. The recording/reproducing circuit 11, when in the reading process, as shown in FIG. 4, generates the data window signal from the recording/reproducing clock signal having the low frequency. Then, the reading output of the magnetic head 4 is binarized by the data window signal, thereby obtaining the regenerative signal. Similarly when in the writing process, the write data is supplied to the magnetic head 4 in accordance with the recording/reproducing clock signal. Then, the operation returns to step S20.

In the third embodiment, in the case of being driven by the battery in the note-type personal computer etc, the power source voltage inputted to the magnetic disk device is monitored. In the case of the battery drive, the power source voltage indicates a residual capacity (a load capacity) of the battery. Accordingly, if the power source voltage decreases under the predetermined voltage, it is judged that the residual capacity of the battery decreases, and the operation is switched over to the low-speed revolution mode. A battery drive time can be also thus extended by reducing the consumed electric power.

Another method of detecting the load capacity of the power source is that the personal computer detects the residual capacity of the battery (the load capacity of the power source). The personal computer, when the residual capacity of the battery decreases under a predetermined level, transmits a battery alarm signal to the MPU 10 of the magnetic disk device. The MPU 10, upon receiving the battery alarm signal, switches over to the low-speed-revolution mode. The battery drive time can be also thus extended.

In addition to the embodiments discussed above, the present invention may include the following modifications.

(1) In the embodiments discussed above, the disk drive has been exemplified as the magnetic disk drive, however, other types of disk drives such as an optical disk drive etc can be applied.

(2) There have been explained the case of detecting the load of the motor and the case of detecting the load capacity of the power source, however, these cases may be combined.

The present invention has been described by way of the embodiments but may be modified in a variety of forms within the scope of the gist of the present invention, and those modifications are not excluded from the range of the present invention.

As discussed above, the present invention exhibits the effects which follow.

(1) There are the first mode of making the spindle motor revolve at a comparatively high speed and reading the data on the disk storage medium by the magnetic head, and the second mode of making the spindle motor revolve at a comparatively low speed and reading the data on the disk storage medium by the magnetic head. Then, the first mode and the second mode are selected corresponding to the power source capacity or the load of the spindle motor. Therefore, if the load of the spindle motor is high, the data are recorded and reproduced at the low-speed revolutions, whereby the consumed electric power can be restrained from rising. Further, if the power source capacity is small, the data can be recorded and reproduced at the low-speed revolutions, which leads to a reduction in the consumed electric power. Accordingly, the battery drive time of the battery driving device can be particularly extended.

(2) The spindle motor exhibiting the high torque constant and the small limit number of revolutions can be used, and hence the consumed electric power can be further decreased.

What is claimed is:

1. A method of controlling a disk drive having a disk storage medium, a spindle motor for rotating said disk storage medium, and a head for reading data on said disk storage medium, comprising:

a first step of detecting a load of said spindle motor; and a second step of selecting one of a first mode for revolving said spindle motor at a comparatively high speed and reading the data on said disk storage medium by said head, and a second mode for revolving said spindle motor at a comparatively low speed and reading the data on said disk storage medium by said head in accordance with a detected result of said first step.

2. The method of controlling a disk drive according to claim 1, wherein said second step comprises a step of selecting said second mode when the load is higher than a predetermined value.

3. The method of controlling a disk drive according to claim 2, wherein said second step further comprises a step of retaining said second mode for a predetermined time after selecting said second mode.

4. The method of controlling a disk drive according to claim 2, wherein said second step comprises a step of returning to said first mode corresponding to the fact that the load of said spindle motor is lower than a second predetermined value after selecting said second mode.

5. The method of controlling a disk drive according to claim 1, wherein said first mode of said second step comprises a mode for reading the data on said disk storage medium with a relatively high frequency clock, and said second mode of said second step comprises a mode for reading the data on said disk storage medium with a relatively low frequency clock.

6. The method of controlling a disk drive according to claim 1, wherein said first mode of said second step comprises a mode for reading and writing the data on and from said disk storage medium with a relatively high frequency clock, and said second mode of said second step comprises a mode for reading and writing the data on and from said disk storage medium with a relatively low frequency clock.

7. The method of controlling a disk drive according to claim 1,
wherein said first step include a step of detecting a temperature of said spindle motor.

8. The method of controlling a disk drive according to claim 1,
wherein said first step include a step of detecting a revolution interval of said spindle motor.

9. An apparatus for controlling a disk drive having a disk storage medium, a spindle motor for rotating said disk storage medium, and a head for reading data on said disk storage medium, comprising:
detecting means for detecting a load of said spindle motor; and
a control circuit for selecting one of a first mode for revolving said spindle motor at a comparatively high speed and reading the data on said disk storage medium by said head, and a second mode for revolving said spindle motor at a comparatively low speed and reading the data on said disk storage medium by said head in accordance with a detected result of said detecting means.

10. The apparatus for controlling a disk drive according to claim 9,
wherein said control circuit selects said second mode when the load is higher than a predetermined value.

11. The apparatus for controlling a disk drive according to claim 10,
wherein said control circuit retains said second mode for a predetermined time after selecting said second mode.

12. The apparatus for controlling a disk drive according to claim 10,
wherein said control circuit returns to said first mode corresponding to the fact that the load of said spindle motor is lower than a second predetermined value after selecting said second mode.

13. The apparatus for controlling a disk drive according to claim 9,
wherein said spindle motor includes a fluid bearing as a bearing mechanism, and
said detecting means include a temperature sensor of said spindle motor.

14. The apparatus for controlling a disk drive according to claim 9,
wherein said control means include
a first clock generator for generating a relatively high frequency clock;
a second clock generator for generating a relatively low frequency clock; and
a selecting means for selecting one of said relatively high frequency clock and said relatively low frequency clock as a reading clock.

15. The apparatus for controlling a disk drive according to claim 14,
wherein said head comprises a head for reading and writing the data on and from said disk storage medium.

16. The apparatus for controlling a disk drive according to claim 9,
wherein said detecting means include means for detecting a revolution interval of said spindle motor.

17. A method of controlling a disk drive having a disk storage medium, a spindle motor for rotating said disk storage medium, and a head for reading data on said disk storage medium, comprising:
a first step of detecting at least one of a load of said spindle motor and a load capacity of a power source of said disk drive; and
a second step of selecting one of a first mode for revolving said spindle motor at a comparatively high speed and reading the data on said disk storage medium by said head, and a second mode for revolving said spindle motor at a comparatively low speed and reading the data on said disk storage medium by said head in accordance with a detected result of said first step,
wherein said second step comprises:
a step of selecting said second mode when the load capacity is smaller than a predetermined value; and
a step of returning to said first mode corresponding to the fact that the load of said spindle motor is lower than a second predetermined value, or that the load capacity is larger than a third predetermined value, after selecting said second mode.

18. The method of controlling a disk drive according to claim 17, wherein said second step further comprises a step of retaining said second mode for a predetermined time after selecting said second mode.

19. The method of controlling a disk drive according to claim 17, wherein said first step includes a step of detecting a voltage of said power source.

20. An apparatus for controlling a disk drive having a disk storage medium, a spindle motor for rotating said disk storage medium, and a head for reading data on said disk storage medium, comprising:
detecting means for detecting at least one of a load of said spindle motor and a load capacity of a power source of said disk drive; and
a control circuit for selecting one of a first mode for revolving said spindle motor at a comparatively high speed and reading the data on said disk storage medium by said head, and a second mode for revolving said spindle motor at a comparatively low speed and reading the data on said disk storage medium by said head in accordance with a detected result of said detecting means,
wherein said control circuit selects said second mode when the load capacity is smaller than a predetermined value and returns to said first mode corresponding to the fact that the load of said spindle motor is lower than a second predetermined value, or that the load capacity is larger than a third predetermined value, after selecting said second mode.

21. The apparatus for controlling a disk drive according to claim 20, wherein said control circuit retains said second mode for a predetermined time after selecting said second mode.

22. The apparatus for controlling a disk drive according to claim 20, wherein said detecting means include means for detecting a voltage of said power source.

* * * * *